United States Patent

[11] 3,570,565

[72] Inventor Stanley R. Morgan
 18 School St., Warehouse Point, Conn. 06088
[21] Appl. No. 764,535
[22] Filed Oct. 2, 1968
[45] Patented Mar. 16, 1971

[54] MULTI-PURPOSE TOOL
 2 Claims, 4 Drawing Figs.
[52] U.S. Cl. .................................................... 144/1,
 143/1, 144/35, 77/15
[51] Int. Cl. ...................................................... B27c 9/02
[50] Field of Search........................................... 143/1,
 1—1, 35, 41; 144/1, 1—3, 1—10, 35, 35—1, 1—9;
 77/15, 32; 83/582, 588, 590

[56] References Cited
UNITED STATES PATENTS

| | | | |
|---|---|---|---|
| 2,347,374 | 1944 | Stahler | 143/35 |
| 2,655,957 | 1953 | Lagant | 143/35X |
| 2,881,519 | 1959 | Gardner | 143/1X |
| 2,997,900 | 1961 | Pugsley | 144/35UX |
| 3,180,183 | 1965 | Stanley et al. | 77/15X |
| 3,465,793 | 9/1969 | Zuk | 143/1 |

Primary Examiner—Francis S. Husar
Assistant Examiner—James F. Coan
Attorney—Chapin, Neal and Dempsey ABSTRACT: A multipurpose tool which may be employed for above table operations, such as drilling, buffing, and grinding, or below table operations, such as sawing and shaping, wherein rotary tool mounting means is vertically adjustable so that it may be positioned above or below a worktable.

INVENTOR.
STANLEY R. MORGAN

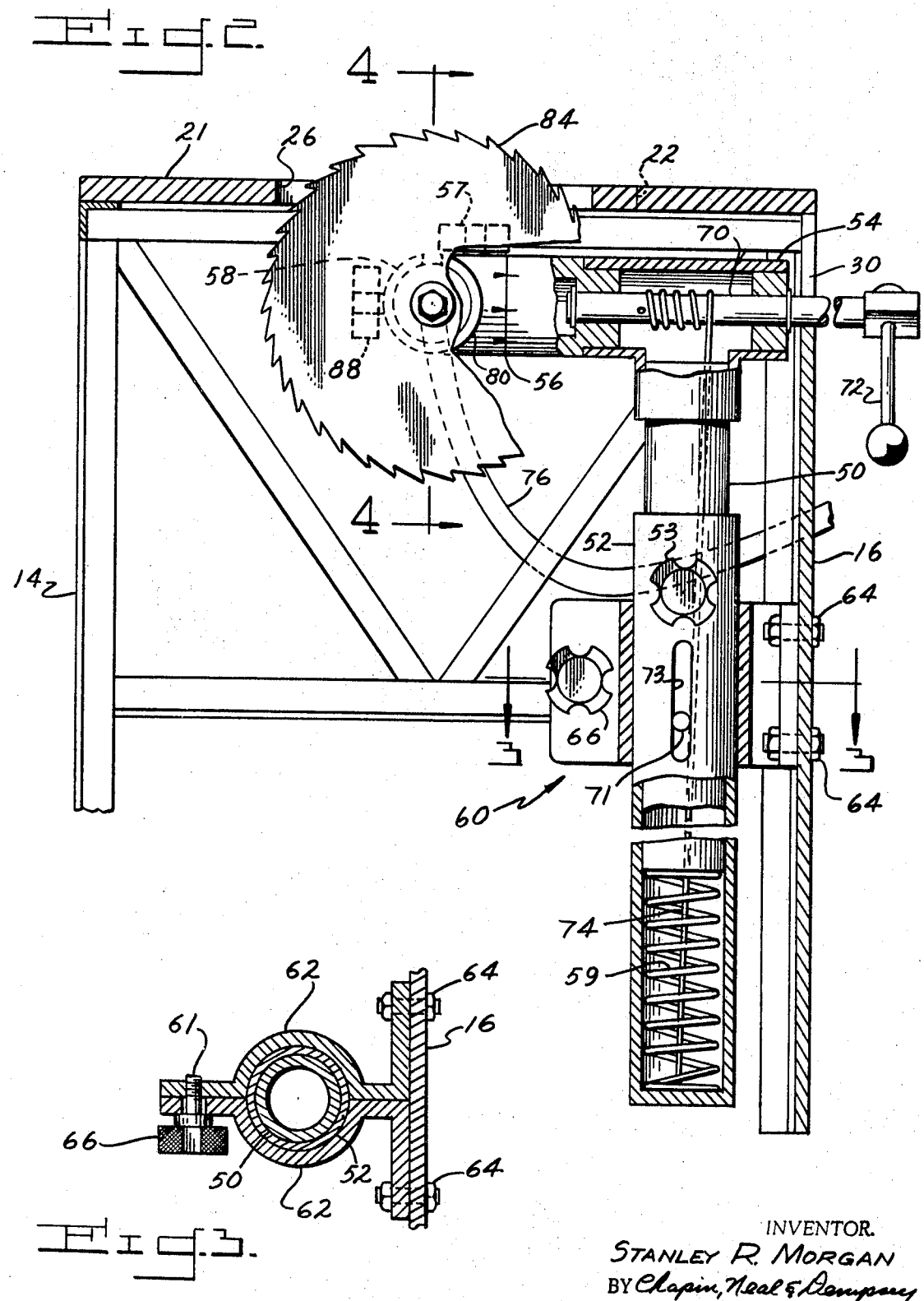

INVENTOR.
STANLEY R. MORGAN

MULTI-PURPOSE TOOL

The present invention relates to a multipurpose tool which may be basically used as a drill press and/or table saw as well as other workshop functions, such as sanding, grinding, shaping, etc.

As is known, the "do-it-yourself" trend has provided a very large market for all kinds of tools. Of the tools that are most commonly used the drill and the saw are two of the most important. While there are a number of combination type tools on the market as represented by U.S. Pat. No. 3,036,608 to Weber and U.S. Pat. No. 2,768,663 to Jones, these type tools tend to be expensive, difficult to use, and/or limited in capabilities.

It is an object of this invention to provide an inexpensive and versatile multipurpose tool assembly.

It is a further object of this invention to provide a multipurpose tool assembly having sufficient work area for drilling, grinding, sanding, and cutting operations.

It is another object of this invention to provide a multipurpose tool assembly which may easily and quickly be changed from a drilling assembly to a sawing assembly.

Other objects and advantages of the invention will become apparent upon reading the depicting detailed description with reference to the drawings, in which:

FIG. 2 is a section view taken along the line 2-2 of FIG. 1 wherein a sawing assembly is shown;

FIG. 3 is a section view taken along the line 3-3 in FIG. 2; and

Figure 1:
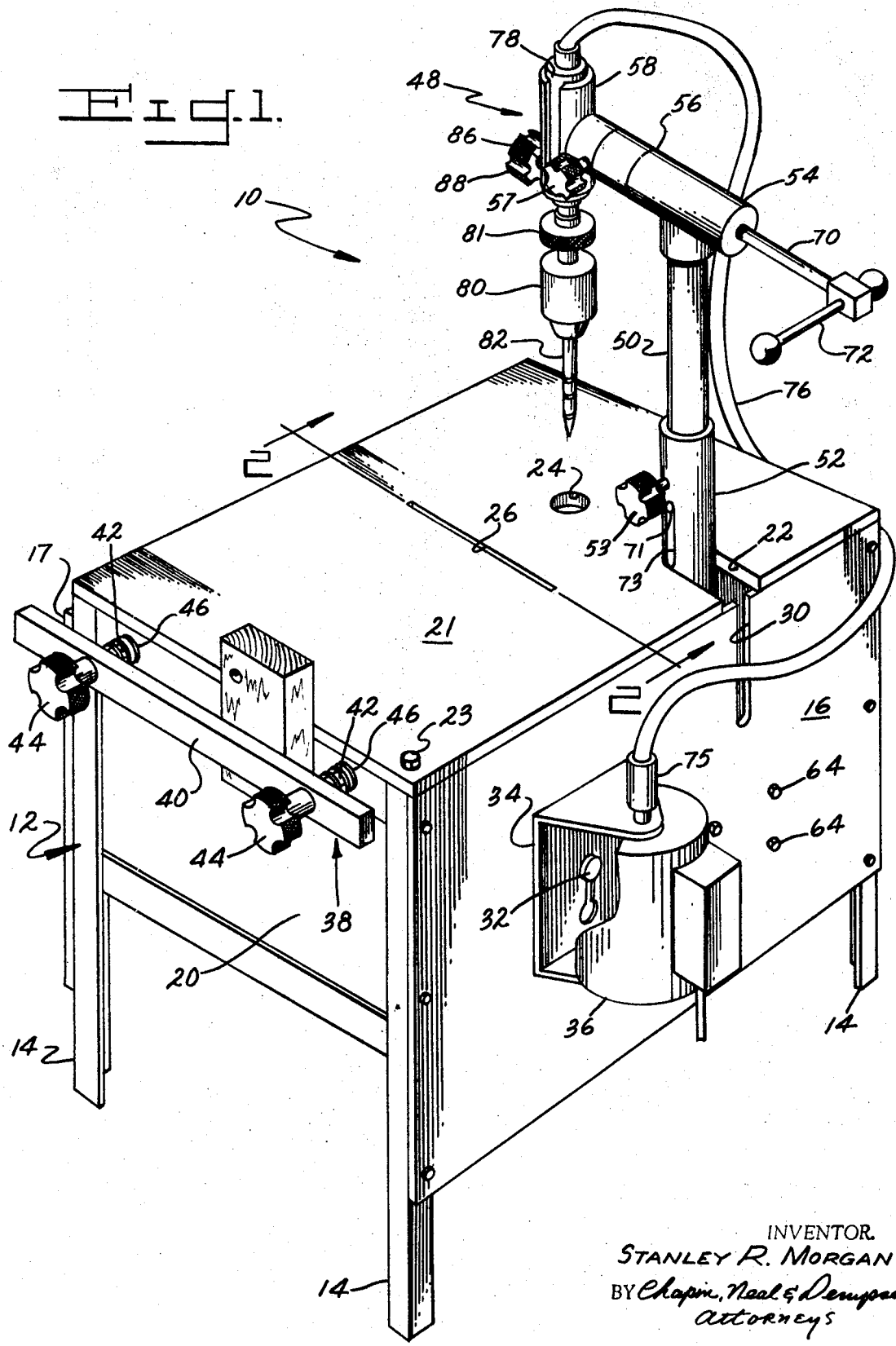
FIG. 1 is a top perspective view of the multipurpose tool of the present invention, wherein a drilling assembly is depicted.

Turning to FIG. 1, it will be seen that the multipurpose tool assembly 10 is shown in a drill press setup.

As shown, the tool assembly 10 mainly comprises a chest-like structure 12 with a plurality of legs 14 depending therefrom. The chest 12 is formed by a back plate or rear wall 16, front plate 17, bottom 18 (see FIG. 2) and right side plate 20 and supports a worktable or top 21 loosely pivoted on pin or stud 23. A U-shaped cutout section or slot 22 is disposed adjacent the rear edge of the worktable 21, and tool clearance slots 24 and 26 are also located in the top of the worktable 21.

The backplate 16 of the chest 12 is provided with a U-shaped guideway 30 disposed in communicating relationship with the U-shaped cutout 22 of the worktable 21. A pin 32 located on the backplate 16 extends outwardly thereof for releasably supporting motor frame 34 and electric motor 36 held therein.

As is further shown, a clamping device 38 is disposed to one end of the chest 12 and comprises a clamping bar 40 having a pair of draw screws 42 passing therethrough and attached to tightening knobs 44. Coil springs 46 are disposed about the screws 42 so as to urge the clamping bar 40 against the tightening knobs 44.

Tool mounting means, generally indicated by 48 is shown extending upwardly of the worktable 21 through slot 22. The tool mounting means 48 is designed so as to enable relative vertical positioning of a tool with respect to the worktable 21. Said tool mounting means comprises a telescoping member 50, slidably mounted in a receiver 52, a T-member 54 disposed at the uppermost portion of the telescoping member 50 and perpendicular thereto, indexing means 56 and a tool clamp or holder 58. The indexing means 56 is provided to permit angular displacement of the tool holder 58.

Referring to FIGS. 1, 2, 3 and 4, it will be seen that the tool mounting means 48 is primarily positioned relative to the worktable 21 by clamping means 60. As shown the clamping means 60 comprises a pair of pinch plates 62 secured to the backplate 16 by a plurality of fastening devices, such as bolts 64. As seen most clearly in FIG. 3, the pinch plates are drawn together by the action of bolt 61 threaded into one of said plates and a hand knob 66 affixed to the free end of the bolt which acts against the other of said pinch plates.

A tool feed mechanism is provided by feed shaft 70 journaled within T-member 54, lever 72, a flexible cable 74 affixed to said feed shaft and the bottom of said receiver 52 and biasing means, such as spring 59, disposed in said receiver for urging said telescoping member 50 upwardly. Feed limit means is provided by lug 71 disposed on telescoping member 50 and slot 73 in the receiver 52. The lug 71, which may be a setscrew or the like, is disposed in said slot 73 so as to lie flush with or slightly beneath the outer surface of the receiver 52. Saw feed limit means also prevents relative angular movement between the telescoping member 50 and the receiver 52.

Figure 4:
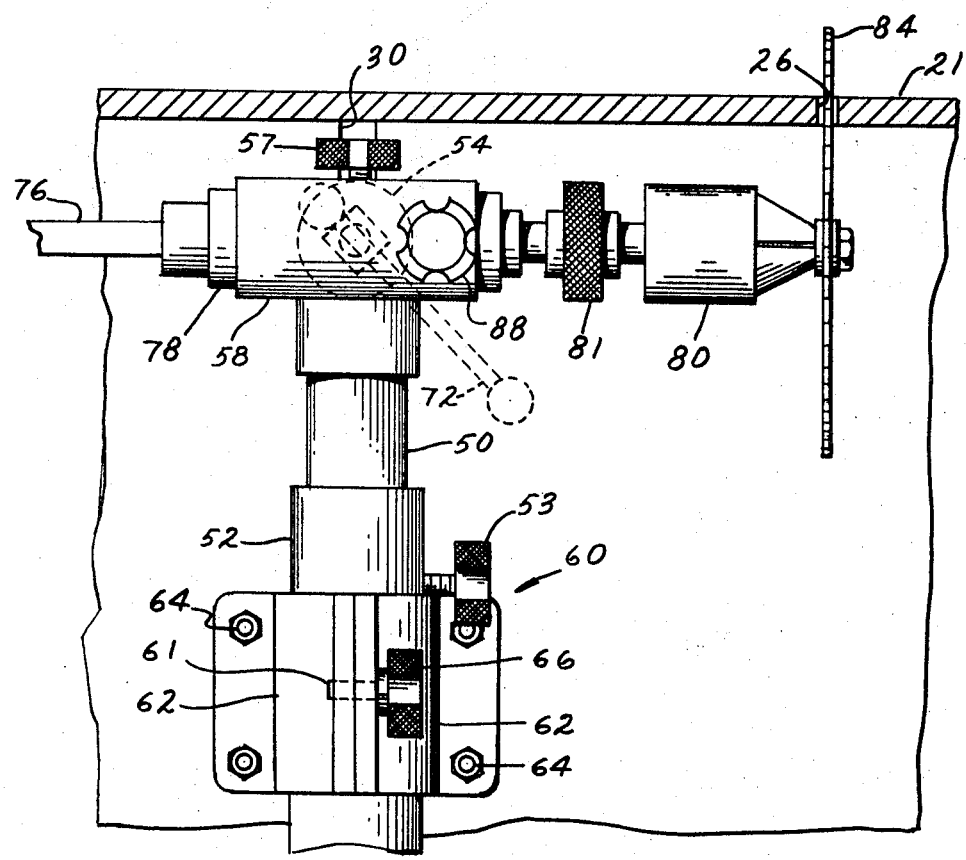
FIG. 4 is a partial section view taken along the line 4-4 of FIG. 2.

The electric motor 36 is coupled by coupler 75 to a flexible power shaft 76 which terminates in drive head 78. A chuck 80 is rotatably affixed to the free end of the power shaft 76 by spinner 81. As shown, the drive head 78 is secured in the tool holder 58 by the action of a set screw 86, which is forced against the drive head 78 by knob 88. The chuck 80 may be used with a drill 82, such as seen in FIG. 1, a specially adapted saw blade 84, such as seen in FIGS. 2 and 4, or other such rotary action tools.

USE AND OPERATION

The use of the multipurpose tool of the present invention is relatively simple. Referring primarily to FIG. 1 it will be noted that the tool is in a drill press attitude. In order to so position the tool, it is first necessary that the tool assembly or mounting means 48 be positioned above the worktable 21. This is accomplished by securing the lower end of the receiver 52 in clamping means 60 and untightening the lock knob 53. By this action, the telescoping member 50 is free for reciprocating movement over the worktable 21. As designed, the reciprocating movement for a drilling action may be accomplished by hand pressure on the T-member 54 or by a steady feed occasioned by turning the feed shaft 70 so as to cause the cable 74 to be taken up thereon and draw the telescoping member 50 into the receiver 52 against the bias of spring 59.

Once the drive head 78 is secured in the tool holder 58, as described, and the drill 82 placed in chuck 80, the electric motor 36 may be switched on and the drilling operation commenced.

The procedure for converting the device of the present invention from a drilling attitude to a sawing attitude is simple and quick.

First, the worktable 21 is pivoted about pin 23 so as to partially remove it from beneath the upper part of the tool mounting means 48. Next, the clamping means 60 is loosened so that the receiver 52 is able to slide downward until the lock knob 53 abuts the top of the clamping means 60 and the flexible power shaft 76 extends into the interior of the chest 12 through the open side thereof.

Next, the clamping means 60 is tightened and the telescoping member 50 is urged into the receiver 52 to the fullest extent permitted by the feed limit means and said telescoping member 50 is retained in this position by action of the lock knob 53. At this point the tool mounting means 48 is completely positioned below the level of the worktable 21. It should be noted, that as the telescoping member 50 is urged downwardly, the extension of the feed lever is disposed within the guideway 30. This gives increased angular support to the tool mounting means 48.

By loosening indexing knob 57, the indexing means 56 may be employed to adjust the attitude of the tool holder 58 relative to the worktable 21 from the vertical to the horizontal. Once the specially adapted saw blade 84 is clamped in the chuck 80, the worktable 21 may be pivoted back into place wherein the saw blade 84 extends upwardly of the worktable 21 through slot 26. As should be clear, the indexing means 56 also permits further angular adjustment of the saw blade 84 for angular cuts.

Of the many advantages of the device of the present invention, one resides in the fact that the power source, i.e., the electric motor 36, may be easily removed from the device and used in a portable fashion. To so use the device, one need but remove the drive head 78 from the tool holder 58 and lift the motor 36 and its frame 34 from the pin 32. At this point the power means, i.e., the motor 36, flexible power shaft 76, drive head 78, and chuck 80, may be used independently of the tool mounting means 48 and worktable 21.

I claim:

1. A multipurpose tool assembly comprising in combination, a chest, a movable worktable on said chest, vertically adjustable tool mounting means mounted within said chest and means for powering a tool, said tool mounting means including a telescoping member, a receiver for receiving said telescoping member, spring means disposed in said receiver for urging said telescoping member upwardly of said receiver and a tool feed mechanism, said tool feed mechanism including a rotatable feed shaft disposed above said telescoping member and perpendicular thereto and a flexible cable having one end thereof affixed within said receiver and the other end thereof affixed to said feed shaft so that rotation of said feed shaft winds said flexible cable thereon and thereby moves said telescoping member into said receiver against the bias of said spring means.

2. The multipurpose tool assembly of claim 1 wherein said tool feed mechanism also includes feed limit means comprising an elongated slot disposed in said receiver and a lug disposed on said telescoping member so as to project into said elongated slot for limiting the vertical travel of said telescoping member to the length of said elongated slot.